May 12, 1970 T. E. DARLOW ET AL 3,511,353

TAPE CONTROLLED APPARATUS

Filed May 25, 1966 3 Sheets-Sheet 1

INVENTORS
TERENCE EDMOND DARLOW
ALBERT JOHN KEEN
RONALD HENRY LEE
BY Hane and Nydick
ATTORNEY INVENTORS
Terence Edmond Darlow
Albert John Keen
Ronald Henry Lee
BY Hane and Nydick
ATTORNEY INVENTORS
Terence Edmond Darlow
Albert John Keen
Ronald Henry Lee
BY
Hane and Nydick
ATTORNEY United States Patent Office 3,511,353

Patented May 12, 1970

3,511,353

TAPE CONTROLLED APPARATUS

Terence Edmond Darlow, St. Albans, Albert John Keen, Letchworth, and Henry Ronald Lee, Stevenage, England, assignors to International Computers and Tabulators Limited, London, England, a British company Filed May 25, 1966, Ser. No. 552,926
Claims priority, application Great Britian, June 1, 1965 23,216
Int. Cl. B41j *15/00;* G06k *7/10*
U.S. Cl. 197—133 7 Claims

ABSTRACT OF THE DISCLOSURE

A tape controlled recording apparatus in which indicia in various channels of a control tape determine different operations of a recording device, is disclosed. A drive arrangement is energised to produce relative movement between a recording device and a recording medium, and a signal generator supplies an electrical signal for each increment of such relative movement. A tape feed motor receives each signal to advance the control tape in synchronism with relative movement between the recording device and recording medium. Also, indicia in the control tape for arresting the relative movement are sensed. Line printers and graphical plotting devices are disclosed as exemplary of various recording devices.

Figures 1, 2:
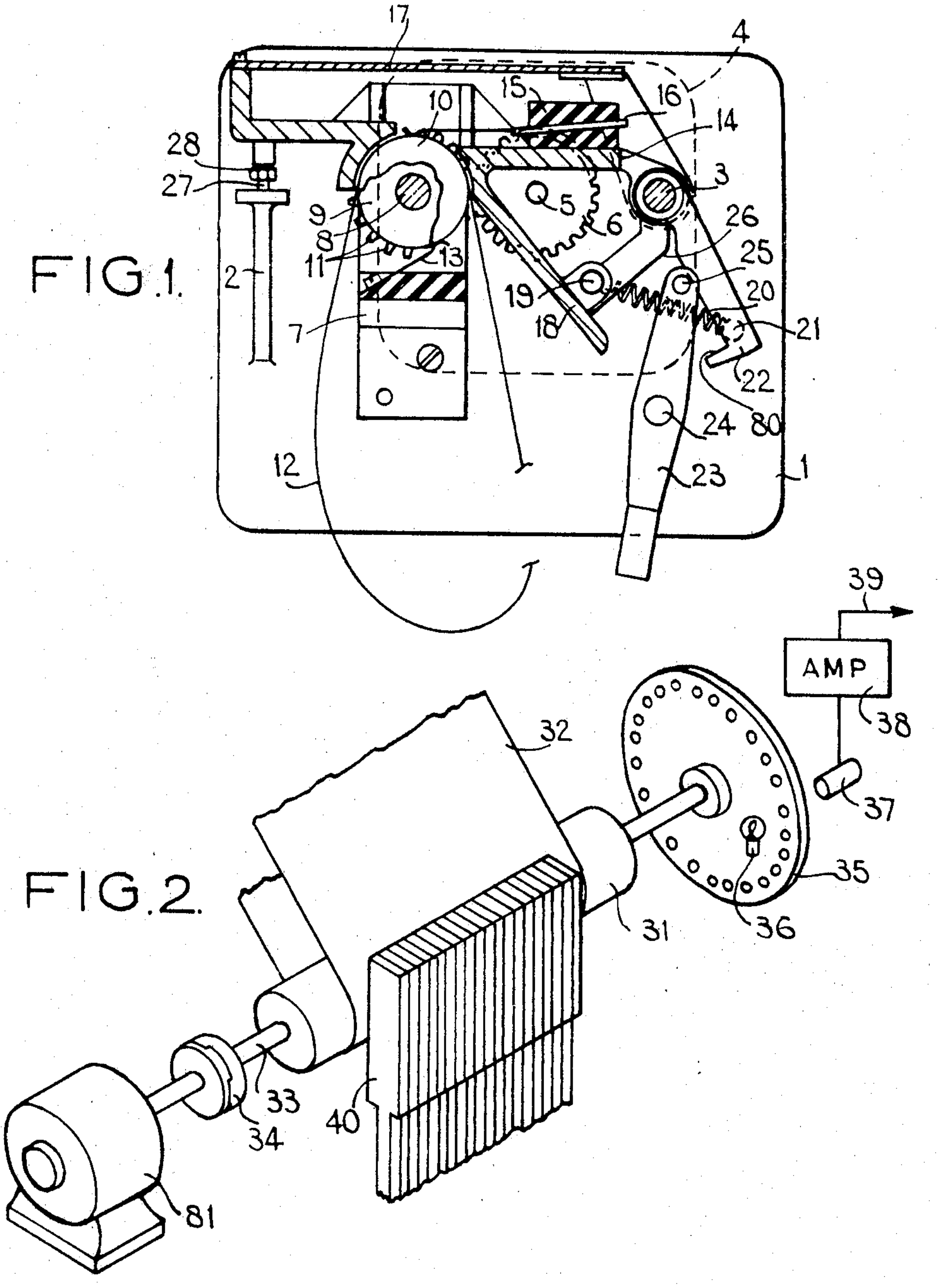

The present invention relates to data processing apparatus controlled by a sequence of instructions recorded in a programme tape.

It has previously been proposed to employ a programme tape carrying a sequence of instructions in association with apparatus for positioning a work member. A relatively simple application of the prior proposals is to be found in connection with the control of movement of paper in data processing apparatus. One example of the use of a tape for this purpose is shown in U.S. Patent specification No. 2,531,885. In this example it is required to control the format of output printing in data processing apparatus. A paper tape is perforated in a pattern corresponding to the required format and the tape is driven by an extension of the paper drive. The perforations in the tape are sensed and output signals from the tape sensing device are used to control positioning of the paper to receive printing. Since the tape and the paper are moved together by a common drive the format control signals are always synchronised to the passage of the paper through the apparatus and positioning of the paper to receive lines of print is then controlled by particular ones of the perforations in the tape. The common drive of both tape and paper ensures synchronism during normal operation of the apparatus, but it will be appreciated that provision is made for adjusting the individual drives relative to one another in order to load paper into the apparatus or to change the tape, for example.

It is an object of the present invention to provide an improved tape driving means for use in tape controlled data processing apparatus.

It is another object of the invention to provide data processing apparatus for controlling positioning of a work member in response to instructions recorded in a control tape having improved means for synchronising the movements of the tape and the work member.

According to one aspect of the present invention, tape controlled data processing apparatus includes means for sensing position indicating instructions from a control tape, means for moving at least one work member into positions indicated by the sensed instructions, signal generating means coupled to the moving means and arranged to generate signals in response to movement of the or each work member and means for moving the control tape with respect to the sensing means under control of said signals.

According to another aspect of the present invention, apparatus for recording information in predetermined positions on a record member includes means for sensing a succession of instructions representing said predetermined positions from a control tape, means for producing relative movement between the record member and a recording device, means for arresting said relative movement under control of sensed instructions, means responsive only to said relative movement to generate electrical impulses and control tape driving means responsive to said impulses to move the control tape in relation to the sensing means.

Figures 3, 4, 5:
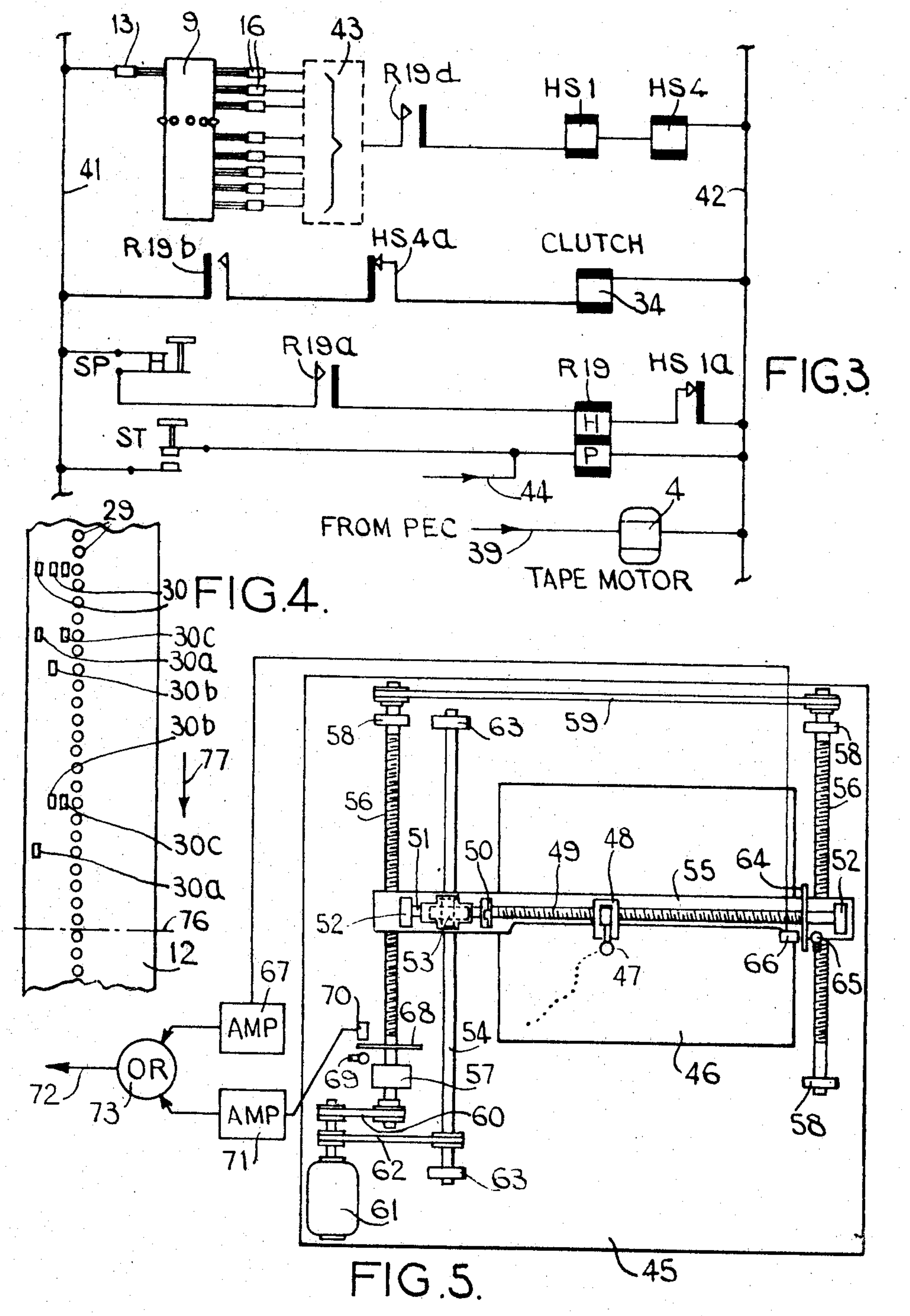
Figure 6:
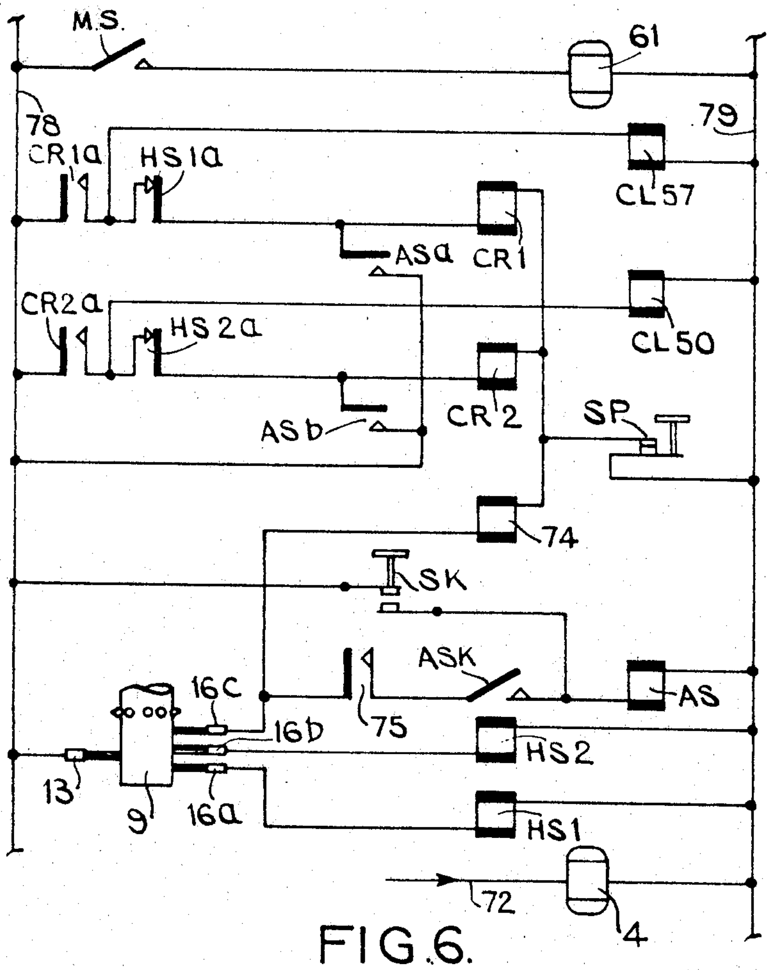

Apparatus embodying the present invention will now be described, by way of example, with reference to the accompanying drawings, in which, FIG. 1 shows, partly in section a control tape feeding device, FIG. 2 shows in diagrammatic form a line printing device, FIG. 3 is a circuit diagram, FIG. 4 shows part of a control tape, FIG. 5 shows in schematic form a graph plotting device, and FIG. 6 is a further circuit diagram.

Referring now to FIG. 1 a control tape feeding device is supported on a mounting plate 1. An impulse driven motor 4 is mounted on one side of the plate 1 and the motor 4 has a drive shaft 5 carrying a gear wheel 6 projecting through the plate 1. A bracket 2 and a hinge pin 3 project from the plate on the side opposite that which carries the motor 4.

A bracket 7 of electrically insulating material is also secured to the plate 1 on the opposite side to that carrying the motor 4. The bracket 7 supports a shaft 8 on which is mounted a sensing roll 9 and a further gear wheel 10. The gear wheel 10 is meshed with the gear wheel 6 and is of electrically insulating material. The sensing roll 9 has a series of sprocket teeth 11 about its periphery, so positioned and spaced to engage with conventional perforations in a paper control tape 12. The control tape 12 is arranged in an endless band and is looped about the sensing roll 9 so that it is driven by the roll 9 by the motor 4 through the gears 6 and 10. The bracket 7 also carries a common brush 13 which provides an electrical connection to the roll 9. The hinge pin 3 supports a casting 14 which is shaped to provide a guide over the upper part of the sensing roll 9 for the control tape 12, the roll 9 projecting through an aperture in the casting 14. The upper surface of the casting carries an insulting block 15 extending the length of the roll 9, and the block 15 carries a number of sensing brushes 16. The brushes 16 are spaced apart in the block 15 so that the span the width of the control tape 12. A cover plate 17 is secured to the casting 14 to cover the brushes 16.

A downwardly projecting part 18 of the casting 14 carries a spring anchorage 19 and a spring 20 extends from the anchorage 19 to a pin 21 carried on a lever 22 hinged about the hinge pin 3. A handle 23 is pivoted at its mid-point about a pivot 24 carried by the plate 1 and carries a stud 25 at its upper end. The stud 25 cooperates with the lever 22 and with a cam surface 26 formed on the casting 14. As shown in the drawing it will be seen that rotation of the handle 23 about the pivot 24 in a clockwise direction causes the lever 22 to be engaged by the stud 25 and the lever is then moved outwards against the tension of the spring 20. The limit of rotation of the handle 23 in this direction is set by a hook 80 formed on the free end of the lever 22.

Extension of the spring 20 by this movement of the handle 23 provides a force acting on the casting 14 tending to turn the casting 14 about the hinge pin 3 and close the casting 14 towards the sensing roll 9. The extent of the closure of the casting 14 about the roll 9 is limited by an adjustable screw 27, secured in the underside of the casting 14 by a locknut 28, which bears against the bracket 2.

Rotation of the handle 23 in an anticlockwise direction as shown in the drawing, releases the tension of the spring 20, and engagement of the stud 25 with the cam surface 26 causes the casting 14 to turn about the hinge pin 3 and move away from the sensing roll 9 to allow the control tape 12 to be removed from the device.

The control tape 12, as shown in FIG. 4, is perforated with sprocket-engaging holes 29 along its length and the sprocket holes 29 engage with the sprocket teeth 11 so that the tape 12 is advanced past the sensing brushes 16 by rotation of the gears 6 and 10. The arrangement of the gears is such that the tape is advanced by a distance equal to the pitch of the sprocket-engaging holes 29 for each impulse applied to the motor 4. Indicia are recorded on the tape 29 by perforations, such as those indicated at 30 in FIG. 4. These perforations 30 are made in tracks along the length of the tape 12 and the sensing brushes 16 are spaced across the block 15 so that each brush 16 scans a different track of the tape 12 to detect any indicia recorded therein, as the tape 12 is advanced.

In the U.S. patent specification referred to earlier, a control tape is used to carry printing format control instructions represented by perforations in order to control positioning of a paper web in a printing apparatus. In a similar manner, the tape feeding device described above is also useable to control the positioning of a web in relation to a line printer. Since the operation of a line printer is well known as such, and such a device is described in detail in the U.S. patent specification referred to, the following description is concerned only with those parts of the printer as are necessary for an understanding of the application of the control tape feeding device to the printer.

As indicated in FIG. 2, a printer consists of a platen 31 about which a paper web 32 is fed. The paper web may be fed in any suitable manner using conventional paper feeding devices such as pressure rolls or tractor feeds, but for the sake of simplicity, in the present case it will be assumed that the paper is directly fed by revolution of the platen 31. To this end the platen 31 is driven by a shaft 33 from a clutch 34, which may conveniently be one of the well known electromagnetically actuated clutches and which, when actuated, couples the shaft 33 to a continuously running electric motor 81. An impulse generator consisting of a perforated disc 35 mounted on an extension of the platen shaft 33 is illuminated by a lamp 36 and is scanned by a photo-electric cell 37. As the shaft 33 rotates the passage of light from the lamp 36 through the perforations in the disc 35 results in the generation of a series of electrical impulses by the photo-electric cell 37. These impulses are amplified by an amplifier 38. A group of conventional printing members 40 is provided across the platen 31 to define a printing line in which characters may be printed. The disposition of the perforations in the disc 37 is such that an electrical impulse is passed to an output line 39 from the amplifier 38 for each line space on the web 32 passing the printing line.

FIG. 3 shows a circuit for coupling the tape feeding device to the printer in order to synchronise the feeding of the control tape with the operation of the printer. In operation, the paper web 32 is positioned in a predetermined starting position relative to the printing line on the platen 31, and the control tape 12 is inserted into the feeding device in a corresponding position. The platen of the printer is initially set into motion by manual closure of a start key ST (FIG. 3) which provides a circuit from a supply line 41 to energise a winding P of a relay R19 which is connected to a further supply line 42. Relay R19 operates and a holding circuit for the relay is established through a circuit from line 41, contacts SP, contacts R19*a* (now closed), the holding winding H of relay R19, contacts HS 1*a* to line 42. Contacts R19*b* of relay R19 also close to provide a circuit from line 41, contacts R19*b*, contacts HS4*a*, to energise the operating coil of the clutch 34 connected to line 42.

The clutch 34 (FIG. 2) is operated to couple the motor 81 to the platen 31 to feed the paper web 32. As the platen rotates, electrical impulses are generated and output pulses on line 39 (FIGS. 2 and 3) pass to the tape feed motor 4. The motor 4 steps the control tape in synchronism with the passage of the web 32 past the printing line.

When a perforation in one of the tracks of the control tape 12 is detected by one of the brushes 16 of the tape feeding device, a circuit is provided from line 41 (FIG. 3) brush 13, the sensing roll 9, the appropriate brush 16, a conventional priority network indicated by the dotted outline 43, contact R19*d* (now closed), relay coils HS1 and HS4 to line 42. The relays HS1 and HS4 are operated. Contact HS4*a* open to disconnect the energising coil for the platen clutch 34, and contact HS1*a* opens to disconnect the holding circuit for the relay R19. The de-energisation of the coil of the clutch 34 brings the platen to rest and prevents the generation of further impulses to drive the tape feed motor 4. It will be realized that other contacts of the relay R19 are employed to initiate a printing operation in the conventional manner. At the conclusion of a printing operation, the printing control arrangements provide an electrical signal over a line 44. This signal is applied to energise the winding P of relay R19 and the tape and web feeding operations recommence. The contacts SP are associated with a manual stop key to enable the apparatus to be brought to rest under manual control by opening the holding circuit for the relay R19. Because the tape feed motor 4 is directly driven by impulses from the amplifier 39 which occur only while the paper web 32 is moving, it will be clear that synchronism between the paper web 32 and the control tape 12 is constantly maintained.

The simplest application of the tape drive to the printer requires only that the tape 1 is perforated in one track at all line positions where printing is required. In a more complex arrangement, the instructions represented by perforations in the tape may also provide for operation of the printer control arrangements. Thus, for example, in the case where a list of items is to be printed on a sheet of specified length, it will often happen that a sub-total is to be printed towards the end of one sheet and item printing suppressed until the body of a new sheet is positioned at the printing position. Such arrangements are described in detail in the U.S. specification referred to and it will be appreciated that in this case the perforations in the control tape may be so arranged that the particular track in which they occur determines the funtion that is required to be performed. In this case, too, the brushes 16 which scan the tape are arranged in a distributing circuit so that signals resulting from the detection of a perforation in the tape 12 are distributed to that particular circuit in the priter control arrangement which controls the operation next to be performed. Thus, where the brushes 16 detect a perforation indicating that a sub-total is to be printed, a resultant signal is passed to the printer control arrangement to cause the print control arrangement to initiate a sub-total printing cycle and then energise the clutch 11 to feed to a new sheet. It is also possible for the spacing of the platen to be produced by an escapement mechanism. Even in this case, however, the tape feeder remains in synchronism with the platen.

It will be realised that, although the present description has assumed the use of a printer in which the platen moves with the paper, other forms of printer may also be used in conjunction with the tape feeding unit described. For example, one of the so-called "on-the-fly" printers may be employed. In this kind of printer, the type font is carried by a drum or a series of type wheels and printing is achieved by impelling individual hammers against the wheels as the required character is passing the printing position. It will be appreciated that a platen of the kind described above is not used in this form of printer. Instead the paper is advanced by an independent feeding mechanism such as a set of tractors. In this case, the drive for advancing the paper web 32 is coupled to the paper feeding mechanism instead of the platen as indicated in FIG. 2.

The use of an impulse driven motor to advance the control tape is not confined to the embodiment described above. In another example the tape drive is synchronised to more than one work moving device. One such arrangement is shown diagrammatically in FIG. 5. In this case the control tape is required to control the operation of a graph-plotting device.

The graph-plotting device consists of a table 45 upon which a record sheet 46 is placed to receive the information to be plotted. The plot is produced by a pen 47 supported by a carriage 48 and moveable in one direction across the sheet by a lead screw 49. The lead screw 49 is driven through a clutch 50 by a shaft 51, the lead screw 49 and the shaft 51 being supported between bearings 52 mounted on a bridge piece 55. The shaft 51 is driven by spiral gearing 53 from a splined shaft 54 arranged below the bridge piece 55 at right angles to the lead screw 49. The entire bridge piece 55 together with the attachments is moved in a direction at right angles to the movement of carriage 48 by a pair of lead screws 56 which engage with nuts (not shown) under the bridge piece 55. The two lead screws 56 are supported in bearings 58 mounted on the table 45 and are coupled together by a toothed belt to rotate in synchronism. The screws 56 are driven by a toothed belt 60 from a continuously running motor 61 through a clutch 57. A further toothed belt 62 from the motor 61 drives the splined shaft 54 which is supported in bearings 63 mounted on the table 45. The lead screw 49 carries an impulse generator consisting of a preforated disc 64, a lamp 65, a photoelectric cell 66 and an amplifier 67. A similar arrangement is provided on one of the lead screws 56, consisting of a disc 68, a lamp 69, a photo-electric cell 70 and an amplifier 71. The outputs from the amplifiers 67 and 71 are connected to an output line 72 through an OR gate 73.

In operation, the selective operation of the clutches 50 and 57 couples the drive from the motor to the lead screws 49 and 56 respectively. Rotation of the lead screws 56 moves the entire bridge piece 55 in one direction over the record sheet 46, while rotation of the lead screw 49 moves the pen 47 across the record sheet 46 at right angles to the direction of movement of the bridge piece 55. Thus, selective movement of the lead screws allows the pen 47 to be positioned at any point on the record sheet 46. The pen 47 is operated to make a mark upon the record sheet by means of an electromagnet 74 (FIG. 6) and operation of the pen in this way closes interlock contacts 75.

It will be realised that the discs 64 and 68 are so synchronized that the aperture detected by the photoelectric cells 66 and 70 respectively occur substantially simultaneously if the lead screws 49 and 56 are rotating concurrently. Thus, electrical impulses for driving the tape motor 4 are passed to the line 72 (FIGS. 5 and 6) when either or both the discs 64 and 68 are rotating.

The operation of the arrangement of FIG. 5 in conjunction with the tape driving arrangement of FIG. 1 will now be described in detail, using a control tape 12 of the form shown in FIG. 4. As indicated in FIG. 4, the control tape 12 has perforations arranged in three tracks. Perforations 30*a* in one track, for example, the left-most track as shown in the figure represent the instruction "Stop pen travel in one direction." Perforations 30*b* in another track, signify the instruction "Stop pen travel in the second direction," and those perforations 30*c* in the third track signify "Initiate recording." It is assumed for the purposes of the following description that the control tape is initially at rest in the tape feeding device with the brushes 16 resting across the tape as indicated by a broken line 76 and that the tape is to be fed in the direction indicated by arrow 77 with respect to the brushes 16.

Referring now to FIG. 6, the graph-plotter drive motor 61 is started by the operation of a motor switch MS, which provides a circuit to connect the motor 61 between two supply lines 78 and 79. The operation of the apparatus is now initiated by closure of manual start key contacts SK. The contacts SK provide a circuit from supply line 78, contacts SK, coil of relay AS to line 79, and the relay AS operates temporarily and closes contacts AS*a* and AS*b*. A circuit now exists from line 78, contacts AS*b*, relay coil CR2, contacts SP to line 78 to operate the relay CR2. A parallel circuit exists from line 78, contacts AS*a*, relay coil CR1, contacts SP to line 79 to operate the relay CR1. Contacts CR1*a* of relay CR1 close to provide a holding circuit for relay CR1 and in a similar manner, contacts CR2*a* provide a holding circuit for relay CR2.

The contacts CR1*a* also provide a circuit from line 78, contacts CR1*a*, coil CL57 to line 79 to energise the coil CL57, which is the operating magnet coil of the clutch 57 (FIG. 5), and in a similar circuit the contacts CR2*a* also cause the coil CL50 of the clutch 50 to be energised.

Energisation of the coils CL57 and CL50 (FIG. 6) respectively causes the clutches 57 and 50 (FIG. 5) to be engaged, with the result that lead screws 56 and 49 rotate, thus producing relative movement between the recording pen 47 and the record sheet 46 and also causing the discs 68 and 64 to rotate to generate electrical impulses which are passed over the line 72 (FIGS. 5 and 6) to actuate the tape feed motor 4.

Referring to FIG. 4, it will be seen that after the control tape 12 has been advanced by five steps, a brush 16 will detect the occurrence of a perforation 30*a* in one track of the tape 12. The particular brush 16 is denoted in FIG. 6 by reference 16*a*, and this brush provides a circuit from line 78, common brush 13, sensing roll 9, brush 16*a*, coil of relay HS1 to line 79, to operate relay HS1. Contacts HS1 of this relay open to disconnect the circuits for the operation of the relay CR1 and the clutch coil CL57, so that the clutch 57 (FIG. 5) is restored to its unoperated condition, thus arresting the lead screws 56. The vertical movement (as shown in the figure) of the pen 47 over the record sheet 46 is thus arrested, but the lead screw 49 and the disc 64 continue to rotate.

After a further three steps of movement of the control tape 12 (FIG. 4) perforations 30*b* and 30*c* are detected. The perforation 30*b* provides a circuit (FIG. 6) from line 78, common brush 13, sensing roll 19, brush 16*b* to energise relay coil HS2. The relay HS2 then disconnects the energising circuits for the relay CR2 and the coil CL50 of the clutch 50 to arrest the relative movement between the pen 47 and the record sheet 46.

The perforation 30*c* provides a circuit extending from brush 16*c*, magnet coil 74 to line 79 to energise the pen magnet and cause a mark to be recorded on the record sheet 46. The pen magnet 74 is of the kind usually referred to as "slow-to-operate," in order that the pen 47 will have come to rest relative to the record sheet 46 before printing takes place.

If it is required automatically to re-start the relative movement between the recording pen 47 and the record sheet 46, an auto-start switch ASK is thrown. In this case, as the mark is recorded, pen magnet contacts 75 close to provide a circuit for the energisation of the auto start relay AS as follows; line 78, contacts 75, contacts AKS, relay AS coil, to line 79. The clutches 50 and 57 are then re-engaged as described earlier. This entire sequence of events is repeated over and over so that the interaction of the lead screws 49 and 56 and operation of the pen 47 produces a plot on the sheet 46.

It will be realised that each individual instruction is represented by a single perforation in a track of the control tape 12, the interpretation of the instruction being dependent upon the precise channel in which the perforation occurs. Thus, two instructions are represented by two perforations, such as 30*b* and 30*c* in the example described in different channels at the same point in the tape.

It will also be realised that other modes of operation of graph-plotting apparatus are possible. For example the lead screws may be selectively and independently driven by suitably modifying the driving arrangements and by, for example, using a greater number of tracks on the control tape. It will be realised, however, that the foregoing description is illustrative only of the use of the tape feeding device in conjunction with the control of at least two work members, the clutches 50 and 57 each separately controlling a movement-producing operation.

In any case it is to be noted that the tape feed motor 4 is directly driven from the output shafts of the movement producing clutches and the control tape is only advanced in the feeding device in response to the movement of a work-piece such as a paper feed or a recording device drive. Consequently, synchronism is maintained between the work-piece drives and the control tape without the need for mechanical interlocking of the control tape feed with the controlled device.

What is claimed is:

1. Tape controlled data processing apparatus for recording information on a planar record member including; a recording device operable to record information on the record member; drive means operative to produce relative movement between the record member and the recording device, said movement being in a plane parallel to the record member; signal generator means operative to generate an electrical signal for each increment of said relative movement between the record member and the recording device; a control tape carrying indicia; sensing means; means to apply each said electrical signal to a tape feed means; said tape feed means operable only in response to each said electrical signal to advance the control tape through a predetermined distance past said sensing means for each increment of said relative movement; and means responsive to signals produced by the sensing means sensing one of the indicia on the control tape to render the drive means inoperative.

2. Apparatus as set forth in claim 1 in which said feed means includes a stepping motor responsive to the signals to advance the control tape past the sensing means by a predetermined distance for each electrical signal and in which the indicia carried by the control tape are spaced apart along the length of the tape by multiples of said predetermined distance, the spacing between successive indicia being proportional to the spaces between the positions at which relative movement is to be arrested.

3. Apparatus as set forth in claim 1 in which the recording device includes a line of printing elements selectively operable to print a line of characters on the record member and in which the drive means includes means for feeding a web of recording material past the line of printing elements and the signal generator means is directly coupled to the means for feeding the web.

4. Apparatus as set forth in claim 3 including means responsive to completion of a line printing operation to render the drive means operative to produce the relative movement between the record member and the recording device

5. Apparatus as set forth in claim 1 including first means for producing relative movement in a first direction between the recording device and the record member parallel to the record member; second means for producing relative movement in a second direction perpendicular to the first direction between the recording device and the record member parallel to the record member; first signal generator means operative to generate a first signal for each increment of movement between the record member and the recording device in the first direction; second signal generator means operative to generate a second signal for each increment of movement between the record member and the recording device in the second direction; first sensing means for sensing first indicia in a first track of the control tape; second sensing means for sensing second indicia in a second track of the control tape; means responsive to said first and second signals to generate tape advance signals; the feed means being responsive to each tape advance signal to advance the tape through the predetermined distance past the first and second sensing means; said first sensing means being operative in response to sensing of one of the first indicia in the first track to arrest the relative movement in the first direction and the second sensing means being operative in response to sensing of one of the second indicia in the second track to arrest the relative movement in the second direction.

6. Apparatus as set forth in claim 5 in which the control tape carries indicia in a further track and in which said sensing means includes means for producing a re-start signal in response to detection of one of the indicia in said further track and including means responsive to said re-start signal to render the drive means operative to produce the relative movement between the record member and the recording device.

7. Apparatus as set forth in claim 1 in which the drive means is operable to produce continuous relative movement between the record member and the recording device and in which the feed means is operable to advance the control tape step by step.

References Cited

UNITED STATES PATENTS

| | | | |
|---|---|---|---|
| 2,531,885 | 11/1950 | Mills et al. | 235—617 |
| 2,788,886 | 4/1957 | Paulding et al. | 197—20 XR |
| 2,894,614 | 7/1959 | Lambert et al. | 197—20 |
| 2,952,844 | 9/1960 | MacDonald et al. | 235—61.11 XR |
| 3,172,598 | 3/1965 | Carson et al. | 234—3 |
| 3,176,819 | 4/1965 | Bloom et al. | 197—133 |
| 3,228,001 | 1/1966 | Herzl. | |
| 3,293,651 | 12/1966 | Gerber et al. | 346—29 |

MAYNARD R. WILBUR, Primary Examiner

T. J. SLOYAN, Assistant Examiner

U.S. Cl. X.R.

235—61.11